June 11, 1968 R. W. ELLIS 3,388,204
GLASS FURNACE ELECTRODE
Filed July 19, 1967 2 Sheets-Sheet 1

INVENTOR.
ROBERT W. ELLIS
BY E. J. Holler &
W. A. Schaich
ATTORNEYS

June 11, 1968  R. W. ELLIS  3,388,204
GLASS FURNACE ELECTRODE
Filed July 19, 1967  2 Sheets-Sheet 2
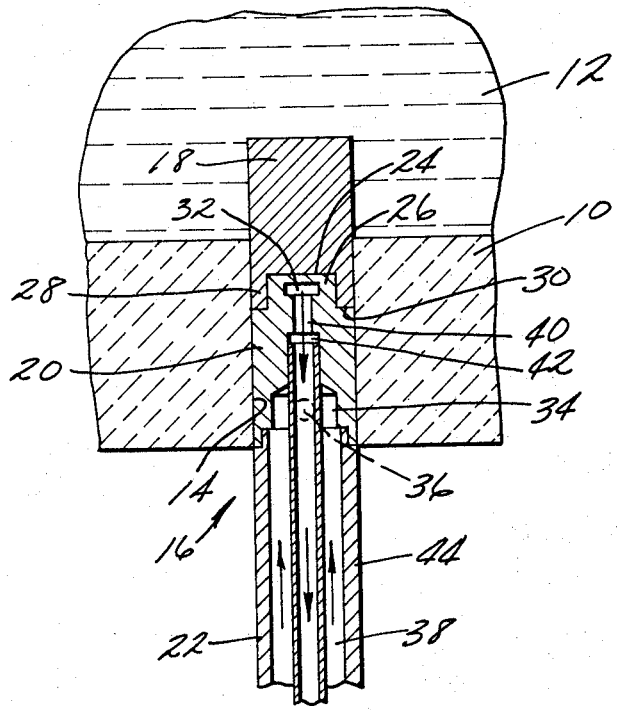
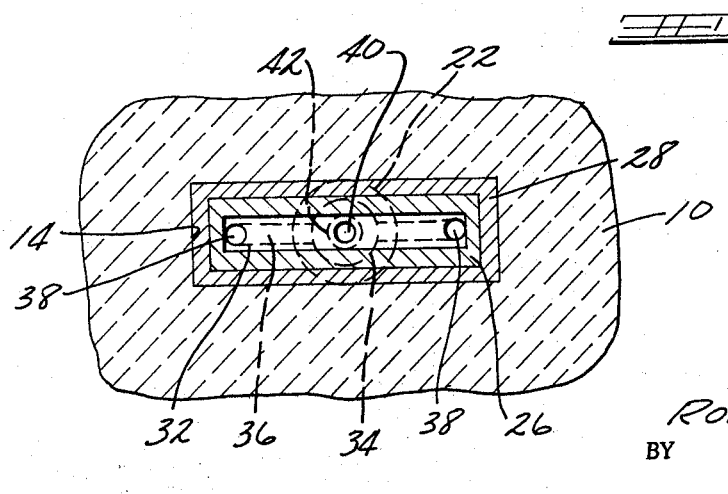
INVENTOR.
ROBERT W. ELLIS
BY E.J. Holler
N.A. Schaich
ATTORNEYS

United States Patent Office 3,388,204
Patented June 11, 1968

3,388,204
GLASS FURNACE ELECTRODE
Robert W. Ellis, Vineland, N.J., assignor to Owens-Illinois, Inc., a corporation of Ohio
Filed July 19, 1967, Ser. No. 654,577
8 Claims. (Cl. 13—18)

ABSTRACT OF THE DISCLOSURE

A water-cooled, glass-melting electrode snugly inserted within a glass furnace wall port, said electrode comprising: a transversely-cooled glass-contacting cap protected from the adverse oxidative effects of atmospheric air; an intermediate water distributor portion isolated from contact with the molten hot glass of said furnace and thereby having a substantially longer useful life than heretofore obtainable; and a stem portion having water inlet and outlet means communicating with the water distributor portion.

Background of the invention

The present invention generally relates to glass melting furnaces; more particularly, it relates to an improved electrode of utility in melting, or augmenting the melting of vitrescent raw materials.

In the manufacture of commercial glass products from batch raw materials it has been found to be desirable, in many instances, to utilize electric melting techniques to accomplish the melting of the raw materials. This technique essentially comprises the positioning of a plurality of electro-conductive electrodes through the side or bottom walls of the furnace in such fashion as to project into the molten glass and, subsequently, impressing a high amperage current across the electrodes. The passage of current through the molten glass causes thermal energy to be dissipated, which in this case is used for glass melting.

Certain electrodes, notably those of the elongated rod type, while very suitable in many particulars have the disadvantage of tending to oxidize within and outwardly of the furnace wall to which they are appurtenant. At its inner end the electrode is covered by molten glass and, therefore, is protected from oxidation; but inside the furnace wall, and outwardly therefrom, there is no such protection and the electrode, operating at elevated temperatures, will be adversely affected or seriously damaged in a comparatively short time by oxidation resulting from infiltration of ambient air at the furnace wall joint between the electrode and the wall.

It has been found that the foregoing oxidative deficiency can be substantially minimized, thereby providing longer electrode life, by decreasing the operating temperature of the electrode. For this purpose, and in an attempt to maintain the electrode below its critical oxidation temperature, electrode systems have been developed which are water-cooled at their furnace wall juncture. Unfortunately, these systems have either proved to be inefficient or have simply created additional shortcomings. The inefficiency appears to be the result of utilizing only localized peripheral cooling; to wit, the elongated rod electrode is provided with an adjacent cooling section so disposed as to cool only a fractional portion of the available longitudinal surface and, consequently, only a proportionately small fraction of the available electrode heat transfer area is effectively utilized. Furthermore, these cooling sections have generally been positioned within the furnace wall at such locations as to be in direct contact with the molten glass. This direct glass contact causes corrosion and erosion of the cooling member, a problem which is remedied, at substantial expense, by either using a cooling section composed of materials highly resistant to molten glass, or using cheaper materials, like steel, and periodically discontinuing the melting operation to allow replacement of the degraded cooling sections.

Summary of invention

With the foregoing in mind, and in accordance with this invention, there is provided an improved, more efficiently cooled electrode configuration, wherein the cooling section is protected against the deleterious effects of molten glass contact, thereby allowing the use of cheaper materials of construction and minimizing the frequency of periodic melting cessation. Furthermore, as the heat transfer efficiency is substantially increased by the electrode configuration of this invention, electrode oxidation is accordingly minimized and the useful life of the electrode is substantially prolonged.

More particularly, in accordance with this invention, there is provided a water-cooled electrode whose transverse dimensions are substantially identical to those of the furnace wall port into which it is inserted, the electrode including: an inner glass-contacting cap, of high heat-resistant material, protecting the remainder of the electrode from adverse molten glass contact; a coolant distributor disposed axially outwardly of said cap in abutting relation therewith having channel means for transverse cooling of said cap; and a stem portion abutting said distributor having coolant ingress and egress conduits in fluid communication with said channel means.

Brief description of drawings

The specific nature of this invention, as well as other advantageous features thereof, will become apparent to those skilled in the art by reference to the drawings, which by way of example illustrate an embodiment of this invention.

In the drawings:

FIG. 2 is a cross-sectional view taken along the line 2—2 of FIG. 1.

FIG. 3 is a cross-sectional view taken along the line 3—3 of FIG. 1.

Description of preferred embodiments

Figure 1:
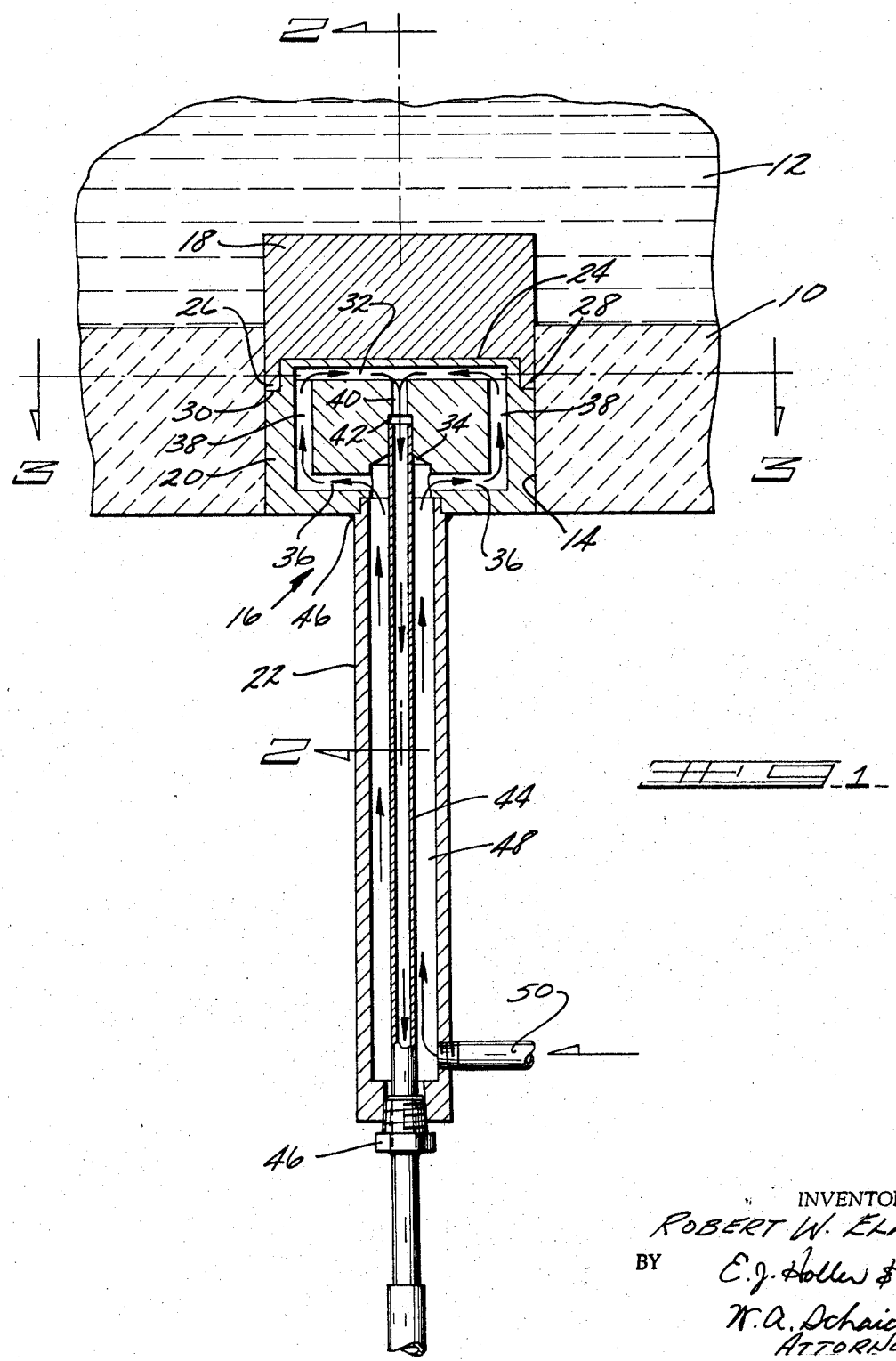
FIG. 1 is a longitudinal cross-sectional view of the electrode installation, embodying this invention, in operative position in the bottom wall of a glass furnace.

Referring now more specifically to the drawings, there is disclosed one of either the side or bottom wall 10 of a furnace of refractory material, such as clay or firebrick and a pool of molten material 12, glass for example, supported and/or contained by wall 10. Integrally formed in wall 10 is an electrode-receiving port 14 having transverse dimensions substantially equivalent to those of a portion of electrode 16, whereby the latter may be complementally and very snugly inserted within port 14. Additionally, although not shown in the drawings, electrode 16 may be provided with suitable means for rigidly maintaining its position within the furnace; these means are well known in the art and typically include bracket or jack members.

According to a preferred embodiment of this invention, electrode 16 includes an inner cap 18 so positioned in port 14 as to protect the remaining portions of the electrode from deleterious contact with molten glass 12. Thus, the remainder of the electrode, notably a coolant distributor 20 and a stem supplying and removing the coolant from distributor 20, being virtually isolated from the molten glass will not be subject to its erosive and corrosive characteristics. Accordingly, the remainder of the electrode may be fabricated of materials whose use is much more economical than those materials required for cap 18, because of the latter's direct contact with the molten glass.

Cap 18, generally of molybdenum, molybdenum alloy or like compositions, is so disposed in port 14 as to have its inner portion projecting into the molten glass while its outer portion, including a recessed panel 24, lies intermediate the inner and outer surfaces of wall 10. It is important that the transverse dimensions be so selected as to enable the longitudinal peripheral surface of cap 18, adjacent recessed panel 24, to very snugly contact the furnace wall, defining port 14, and thereby, to virtually eliminate the possibility of molten glass percolating into the furnace wall-cap juncture.

Positioned outwardly of cap 18 and generally being mounted flush with the outer surface of wall 10 is a coolant distributor 20 which may, for example, be of a steel composition because of the lack of molten glass contact. Similar to cap 18, the distributor may be provided with suitably preselected transverse dimensions whereby it will also snugly engage the furnace wall surface defining port 14 and substantially isolate molybdenum cap 18 from ambient air contact. In order to protect cap 18 from oxidative degradation, resulting from possible seepage of air through the furnace wall-distributor junction, as well as providing similar protection for distributor 20, which is in direct contact with ambient air, cooling means are provided for generally maintaining these members below their critical oxidation temperature.

For purposes of providing an intimate thermoconductive and electroconductive abutting relationship between cap 18 and distributor 20, the latter includes a central upwardly extending neck 26 insertable, in tongue and groove fashion, within recessed panel 24. Further, because of the recessed panel of cap 18 and neck of distributor 20, the former is provided with a perimetrical downwardly extending rib 28 engageable with a shoulder surface 30 of distributor 20 upon such tongue and groove insertion. In passing, it should be mentioned that the juncture of the distributor and cap may be provided with a thermoconductive and electroconductive material (not shown in the drawings), such as silver solder or copper braze, the function of which is to greatly decrease the thermal and electrical resistance of said juncture and, thereby increase the efficiency of electrode 16.

Integrally formed internally of distributor 20 is an array of passageways providing channel means for circulating a caloric absorbing coolant, for example water, therethrough. In the preferred embodiment of this invention, the array of passageways includes an inner transversely elongate channel 32 formed internally of neck 26 proximate rib 28 and recessed panel 24 of cap 18, and coolant inlet and outlet channels fluidly communicating with same. The latter inlet and outlet channels may be formed by providing distributor 20 with an outwardly opening cavity 34 having an outer transversely extending channel 36 communicating therewith, said inner and outer transverse channels 32 and 36 respectively being joined by means of a longitudinally disposed channel, or channels 38. Communicating centrally with inner transverse channel 32 is a central bore or channel 40 fluidly merging with a central counterbore 42, the latter extending into the inner margin of cavity 34 and being adapted to receive a duct 44.

Rigidly affixed to distributor 20, for example by a buttweld 46, is the electrode stem projecting outwardly therefrom. The stem includes an outer conduit 22 and, positioned within its bore, a coaxial duct extending outwardly of conduit 22 and inwardly through cavity 34 into counterbore 42, whereby it fluidly communicates with central bore, or channel 40. At its lower margin, conduit 22 is provided with a threadably engaging plug 46 having a passage sealingly receiving duct 44 and defining an annular fluid-tight chamber 48 communicating with outer transverse channel 36. A suitable coolant, most typically water, is supplied to chamber 48 through a nipple 50 threadably inserted in conduit 22 and is removed from the electrode through duct 44, which as noted supra, extends axially outwardly of chamber 48.

From the foregoing, it will be apparent that the flow of coolant water proceeds upwardly, through annular chamber 48, into cavity 34 where the stream diverges and flows into outer transverse channel 36, thence upwardly into inner transverse channel 32 and exits through central bore 40 which fluidly communicates with duct 44. This transverse cooling proximately parallel the outer surface of the glass contacting cap, as well as the partial longitudinal cooling of said cap, notably of the ribs 28, has been found to greatly increase the overall heat transfer efficiency and thereby provide for longer electrode life.

As mentioned earlier, one of the disadvantages of the prior art electrodes was direct molten glass contact by the coolant carrying member. According to this invention, the glass contacting cap portion of the electrode is very snugly inserted within a furnace wall port and thereby substantially isolates the coolant carrying distributor from such contact. Additionally, should there be a slight glass seepage into the electrode-furnace wall juncture, the improved cooling efficiency provided by the electrode configuration of this invention causes such seeping glass to freeze or congeal before contacting the coolant distributor and, consequently, precludes corrosion or erosion of the latter member. Furthermore, because of improved cooling the electrode oxidative deficiencies, heretofore existent in the prior art devices, have been substantially obviated.

While a preferred embodiment of this invention has been described in detail above, it will be apparent to those skilled in the art that modifications may be resorted to within the spirit and scope of this invention. Accordingly, the embodiment is merely exemplary, not limiting, and the true scope of the invention is to be determined by reference to the following claims.

I claim:

1. An improved glass melting electrode adapted for mounting within a glass melting furnace wall having an electrode-receiving port therein; said electrode comprising an inner glass-contacting cap snugly inserted within said port and including a coolant distributor thermoconductively and electroconductively abutting said cap axially outwardly thereof and being substantially isolated from molten glass contact by said cap, inner transverse channel means formed internally of said distributor adapted to allow a fluid coolant to flow therethrough, and coolant ingress and egress means communicating with said channel means for circulating a coolant through said distributor.

2. The electrode installation of claim 1, wherein said glass-contacting cap includes at its outer portion a recessed panel and said coolant distributor includes at its inner portion an inwardly-extending projection, said projection being complementally insertable within said recessed panel.

3. The electrode installation of claim 2, wherein the juncture of said cap and said distributor includes a thermoconductive and electroconductive material, said material being silver solder or copper braze.

4. The electrode installation of claim 1, wherein said inner transverse channel means is disposed proximate the outer portion of said glass-contacting cap and generally parallel thereto.

5. An improved glass melting electrode installation comprising in combination with a glass melting furnace wall having an electrode-receiving port therein: a cap snugly and flushly positioned in said port with its inner portion projecting inwardly of said furnace wall and its outer portion being disposed intermediate the inner and outer surfaces of said wall, said outer portion having a recessed panel and including an outwardly extending perimetrical rib proximate said panel; a coolant distributor isolated from molten glass contact by said cap having an inwardly projecting neck and including a shoulder adjacently outwardly of said neck, said distributor being snugly positioned within said port axially outwardly of said cap with said neck and shoulder thermoconductively and electroconductively engaging said recessed panel and rib respectively, inner transverse channel means formed internally of said distributor adapted for allowing a coolant to flow therethrough; coolant ingress and egress means communicating with said channel means for circulating a coolant through said distributor.

6. The electrode installation of claim 5, wherein said inner transverse channel means is formed in said distributor neck, said transverse channel thereby being disposed internally of said perimetrical rib and proximately parallel said recessed panel.

7. The electrode installation of claim 6, wherein said coolant ingress and egress means comprises a hollow conduit rigidly affixed to said distributor having a coolant removal duct coaxially mounted within its bore defining an annular chamber therebetween, said annular chamber and said coolant removal duct respectively fluidly communicating with said channel means, and means communicating with said annular chamber for supplying a coolant thereto.

8. An improved glass melting electrode installation comprising in combination with a glass melting furnace wall having an electrode-receiving port therein: a glass-contacting cap snugly inserted in said port having a recessed panel disposed intermediate the inner and outer surfaces of said furnace wall; a coolant distributor thermoconductively and electroconductively abutting said cap axially outwardly thereof and being isolated from molten glass contact thereby, said coolant distributor having an inwardly extending neck positioned in said recessed panel and including an inner transverse channel formed internally of said neck; coolant ingress and egress means communicating with said transverse channel for circulating a coolant therethrough, whereby said cap is cooled.

References Cited
UNITED STATES PATENTS

| | | | |
|---|---|---|---|
| 1,542,716 | 6/1925 | Payne | 13—15 |
| 2,209,515 | 7/1940 | Ehman et al. | 13—6 |
| 2,599,179 | 6/1952 | Hopkins | 13—23 X |
| 2,693,498 | 11/1954 | Penberthy | 13—6 X |
| 2,802,041 | 8/1957 | Bramlett et al. | 13—6 X |
| 3,148,239 | 9/1964 | Pinotti | 13—6 |

BERNARD A. GILHEANY, *Primary Examiner.*

H. B. GILSON, *Assistant Examiner.*